(No Model.)

D. HALSEY, Jr.
COMBINED TAN VAT AND WHEEL.

No. 278,331. Patented May 29, 1883.

Attest
J. K. Frank
Wm. F. D. Crane

Inventor.
Daniel Halsey, Jr.
per Thos. S. Crane, Atty.

United States Patent Office.

DANIEL HALSEY, JR., OF NEWARK, NEW JERSEY.

COMBINED TAN VAT AND WHEEL.

SPECIFICATION forming part of Letters Patent No. 278,331, dated May 29, 1883.

Application filed September 22, 1882. (No model.)

*To all whom it may concern:*

Be it known that I, DANIEL HALSEY, Jr., a citizen of the United States, residing in the city of Newark, in the county of Essex and State of New Jersey, have invented certain new and useful Improvements in Subaqueous Tanning-Wheels, fully described and represented in the following specification and the accompanying drawings, forming a part of the same.

This invention consists in a novel construction and arrangement of and mode of operating a tanning-wheel in a vat, and in the combination, with the vat, of a door in one side, near the bottom.

Figure 1:
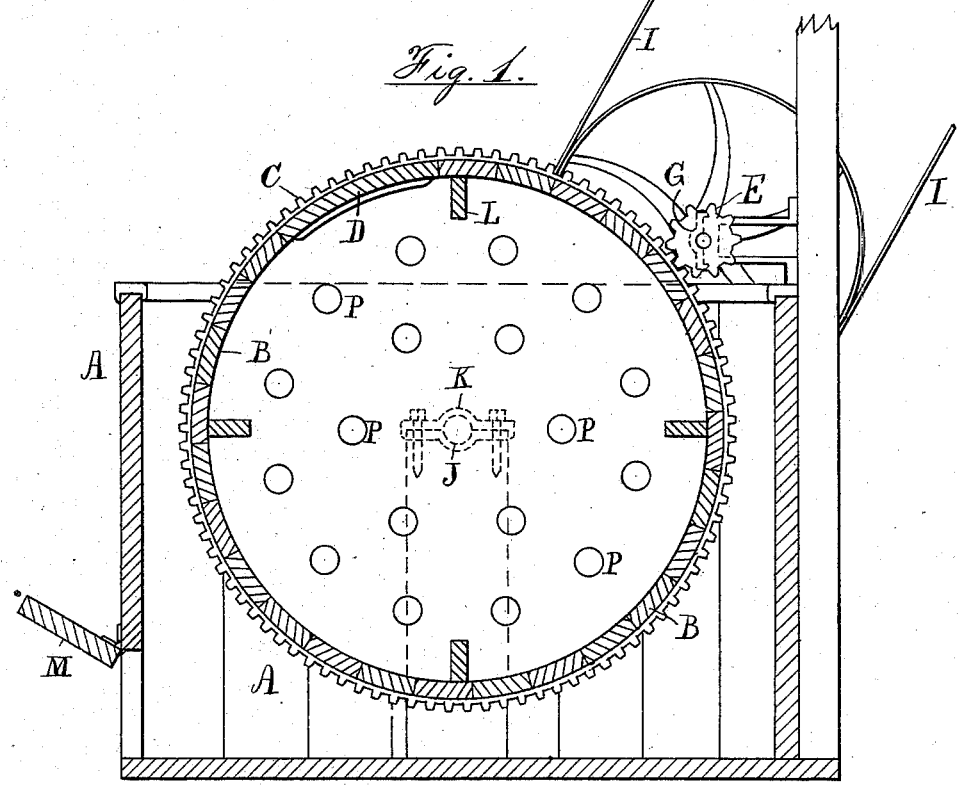
Figure 2:
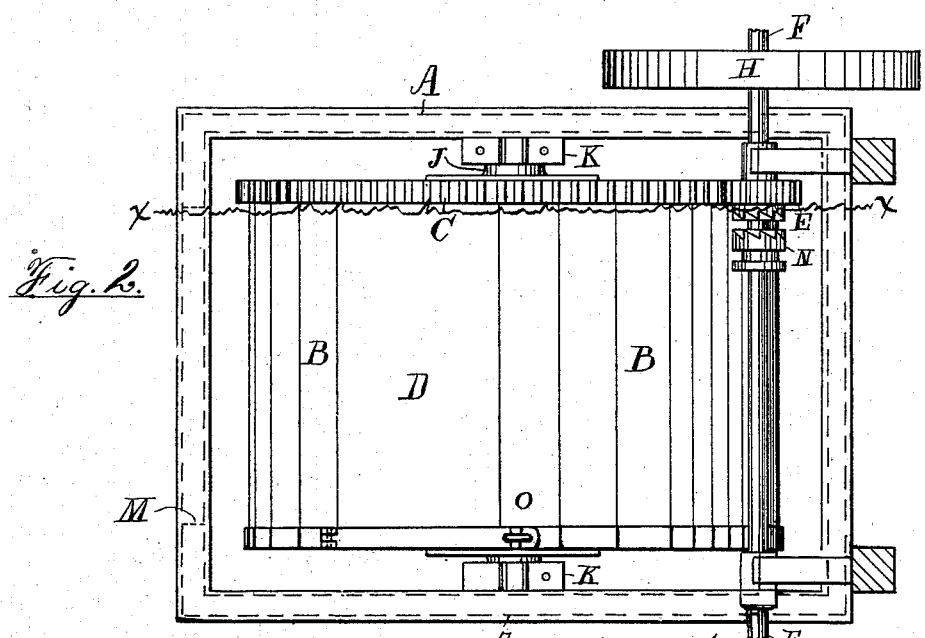

In the drawings annexed, Figure 1 is a transverse section of my improved wheel and vat on line $x$ $x$ in Fig. 2, the latter being a plan of the same.

A is the vat; B, the wheel; C, a gear of ring form secured to the periphery of the wheel at one edge; D, a door for the insertion and removal of the hides from the wheel; E, a pinion for driving the wheel, and F a shaft mounted in bearings G above the wheel, and provided with a pulley, H, to receive a driving-belt, I.

The wheel is mounted by gudgeons J in bearings K, which are secured upon posts fastened to the sides of the vat at a suitable distance to make the bottom of the wheel clear the floor of the vat.

L L are cleats fastened to the inside of the wheel's rim to move the hides, and M is a door in the side of the vat, near the bottom.

N is a clutch provided upon the shaft, in connection with the pinion E, to stop and start the wheel at pleasure. The clutch would be moved by a handle, as is usual, and enables the operator to disconnect any one of several tumbling-wheels, if more than one be driven by the shaft F.

O is a fastening for one end of the door D, the other end being held in place by inserting it under the iron ring-gear C.

P P are holes formed in the sides of the wheel for the free circulation of the tanning-liquor, so that the contents of the wheel will not be retained in contact with the same fluid continuously; but an automatic exchange of the fluids in the wheel and the tank will be effected by the movement of the wheel.

The operation of the apparatus is as follows:

The wheel is made large enough to receive ninety hides, about six feet diameter being a convenient size, and the skins are placed in the wheel and rotated in the tan-liquor about three to six revolutions per minute by the application of suitable power to the shaft F. The hides, when stirred up by the movement of the wheel, tend to float more or less in the liquor, and are constantly moved about in a current of the latter created by the movement of the wheel. The liquor outside the wheel is raised a little by its contact with the periphery of the latter at one side, and correspondingly depressed at the opposite side, where the wheel's rim is descending, thus producing a change of level in the liquor at the front and rear of the tank. The liquor inside the wheel is similarly affected, and thus tends to flow from the apertures P at one part of the wheel and into the apertures at another part, thus securing the circulation desired. When the operation is continued a suitable length of time, the door is opened upon the top of the wheel and the hides removed.

The tan-liquor may be removed from the vat either before or after the removal of the hides, as preferred, and fresh liquor may be furnished to the vat, without stopping the wheel, by drawing off a portion of the spent liquor at a time and supplying the vat with an equal amount of fresh.

The door M is applied to the vat near the bottom, for the application of my improved method and apparatus to the tanning of goatskins and morocco with the use of sumac. In the use of this material the skins are often sewed up with the liquor and ground sumac inside them, and are then placed in contact with the same substance in a tan-vat. By the use of my wheel the sumac is kept suspended in the liquor in the desired manner, and the skins are turned over and over in contact therewith, so as to produce the most satisfactory results, both in regard to the time consumed and the quality of the work performed. The sumac, however, settles to the bottom of the vat when the motion of the wheel ceases, and to remove it conveniently I construct the vat above ground for such a use and provide the door M at the bottom for the convenient removal of the sediment. After that has been done the wheel can be rinsed out with water, which would carry away any sediment from the wheel and flow out of the door at M.

I am aware that it is not new to mount a tanning-wheel in a vat, and do not therefore claim the combination of a wheel and vat, broadly; but in all the previous constructions no effective means have been devised to rotate the wheel continuously, and the method of tanning with such wheels is therefore different from that I have described. My invention contemplates the continuous rotation of the wheel B, especially in tanning with sumac, as the latter can only be kept in suspension by constant agitation, and my construction therefore involves the means for rotating the wheel by power, as the shaft gearing and clutch.

It is obvious that fast and loose pulleys would be an equivalent for the clutch, and that other arrangements for the clutch might be made than those shown in the drawings.

Having thus set forth the nature and object of my invention and pointed out its difference from previous constructions, I claim the same as follows:

A tan-vat supporting a rotary cylinder, substantially as set forth, and provided with the door M, located at the lower portion of the vat, through which the tanning sediment may be removed without removing the cylinder, all as set forth.

In testimony whereof I have hereunto set my hand in the presence of two subscribing witnesses.

DANIEL HALSEY, Jr.

Witnesses:
THOS. S. CRANE,
C. C. HERRICK.